United States Patent
Bauer

(10) Patent No.: US 12,164,535 B2
(45) Date of Patent: Dec. 10, 2024

(54) EFFICIENT IN-MEMORY MULTI-VERSION CONCURRENCY CONTROL FOR A TRIE DATA STRUCTURE BASED DATABASE

(71) Applicant: CENSHARE GMBH, Munich (DE)

(72) Inventor: Walter Bauer, Munich (DE)

(73) Assignee: CENSHARE GMBH, Munich (DE)

( * ) Notice: Subject to any disclaimer, the term of this patent is extended or adjusted under 35 U.S.C. 154(b) by 69 days.

(21) Appl. No.: 17/960,171

(22) Filed: Oct. 5, 2022

(65) Prior Publication Data

US 2023/0022756 A1 Jan. 26, 2023

Related U.S. Application Data

(62) Division of application No. 17/277,238, filed as application No. PCT/EP2019/074932 on Sep. 18, 2019, now Pat. No. 11,693,866.

(30) Foreign Application Priority Data

Sep. 19, 2018 (EP) ..................................... 18195454

(51) Int. Cl.
*G06F 16/2458* (2019.01)
*G06F 12/02* (2006.01)
(Continued)

(52) U.S. Cl.
CPC ...... *G06F 16/2474* (2019.01); *G06F 12/0253* (2013.01); *G06F 16/2246* (2019.01); *G06F 16/2272* (2019.01); *G06F 16/2329* (2019.01)

(58) Field of Classification Search
CPC ............. G06F 12/0253; G06F 16/2474; G06F 16/2329; G06F 16/2246; G06F 16/2272
See application file for complete search history.

(56) References Cited

U.S. PATENT DOCUMENTS 8,767,757 B1 7/2014 Chudgar et al.
8,838,122 B2 9/2014 Stamoulis et al.
(Continued)

FOREIGN PATENT DOCUMENTS

CN 1578257 A 2/2005
CN 1864137 A 11/2006
(Continued)

OTHER PUBLICATIONS

Mar. 1, 2024 Office Action issued in Japanese Patent Application No. 2021-515453, pp. 1-2 [machine translation included].
(Continued)

*Primary Examiner* — Huawen A Peng
(74) *Attorney, Agent, or Firm* — Nixon & Vanderhye PC

(57) ABSTRACT

The invention describes a method for determining a storage location of a database object of a specific version, wherein indexes for each version of the database object are stored in a trie having a root node corresponding to the specific version, the method comprising: determining a trie corresponding to the specific version by accessing the root node of the trie corresponding to the specific version; determining an object identifier of the database object by traversing the trie corresponding to the specific version using a secondary key related to the database object as search key; determining the storage location of the database object by traversing the trie corresponding to the specific version using the determined object identifier as search key.

35 Claims, 10 Drawing Sheets

(51) Int. Cl.
*G06F 16/22* (2019.01)
*G06F 16/23* (2019.01)

(56) References Cited

U.S. PATENT DOCUMENTS

| | | | |
|---|---|---|---|
| 8,868,926 B2* | 10/2014 | Hunt | G06F 16/2255 |
| | | | 713/189 |
| 11,074,179 B2* | 7/2021 | Gidra | G06F 12/0261 |
| 11,204,905 B2 | 12/2021 | Lambov | |
| 2005/0033720 A1 | 2/2005 | Verma et al. | |
| 2010/0146004 A1 | 6/2010 | Sim-Tang | |
| 2011/0128959 A1 | 6/2011 | Bando et al. | |
| 2012/0221538 A1 | 8/2012 | Liedes | |
| 2012/0331018 A1* | 12/2012 | Khanna | G06F 12/023 |
| | | | 707/813 |
| 2014/0153577 A1 | 6/2014 | Janakiraman et al. | |
| 2014/0229521 A1 | 8/2014 | Meadway et al. | |
| 2014/0280318 A1 | 9/2014 | Simms et al. | |
| 2016/0239528 A1* | 8/2016 | Pemberton | G06F 16/211 |
| 2017/0255670 A1* | 9/2017 | Lei | H03M 7/3091 |
| 2018/0004786 A1 | 1/2018 | Danilov et al. | |
| 2018/0324096 A1* | 11/2018 | Moore | G06F 16/322 |
| 2019/0332300 A1* | 10/2019 | Singh | G06F 16/2255 |
| 2020/0004851 A1* | 1/2020 | Lambov | H10K 85/626 |
| 2020/0019384 A1* | 1/2020 | Lyu | G06F 8/33 |
| 2020/0412614 A1 | 12/2020 | A et al. | |
| 2021/0357400 A1 | 11/2021 | Bauer | |

FOREIGN PATENT DOCUMENTS

| | | |
|---|---|---|
| CN | 101467149 A | 6/2009 |
| CN | 103425734 A | 12/2013 |
| CN | 105183915 A | 12/2015 |
| JP | 2000227921 A | 8/2000 |
| JP | 2008065764 A | 3/2008 |
| JP | 2012073943 A | 4/2012 |
| JP | 2014191672 A | 10/2014 |
| JP | 2018509683 A | 4/2018 |
| WO | 2018/167235 | 9/2018 |

OTHER PUBLICATIONS

Demaine D. E., et al., "Confluently Persistent Tries for Efficient Version Control," Algorithm Theory—SWAT 2008; Springer Berlin Heidelberg, Berlin, Heidelberg, Jul. 2, 2008, pp. 160-172.
International Preliminary Report issued in International Application No. PCT/EP2019/074932, mailed on Mar. 23, 2021, 10 pages.
Office Action for European Application No. EP18195454.6, mailed on Nov. 9, 2021, 7 pages.
Partial European Search Report issued in European Application No. EP18195454, mailed on Dec. 18, 2018, 11 Pages.
Yingjun W., et al., "An Empirical Evaluation of In-Memory Multi-Version Concurrency Control, Publication data: Proceedings of the VLDB Endowment", ACM digital library, Mar. 1, 2017, Association of Computing Machinery, New York, vol. 10(7), pp. 781-792.
Extended European Search Report for EP 18195454.6-1217, dated Mar. 19, 2019, 14 pages.
International Search Report and Written Opinion for PCT/EP2019/074932, mailed on Mar. 26, 2020, 15 pages.
Mohammad Dashti et al., "Repairing Conflicts among MVCC Transactions," arxiv.org, Cornell University Library, 201 Olin Library Cornell University Ithaca, NY 14853, Mar. 2, 2016, 12 pages.
Nørvåg, "The vagabond temporal OID index: an index structure for OID indexing in temporal object database systems," 2000 International Database Engineering and Application Symposium, Sep. 18, 2000, pp. 158-166.
Dec. 1, 2023 Office Action issued in Chinese Patent Application No. 201980061597.1, pp. 1-3 [with translation].
Notice of Reasons for Rejection received in Japanese Application No. 2021-515453, mailed on Sep. 28, 2023, 9 pages.
Office Action issued in Chinese Patent Application No. 201980061597.1, May 6, 2024, 15 pages.

* cited by examiner

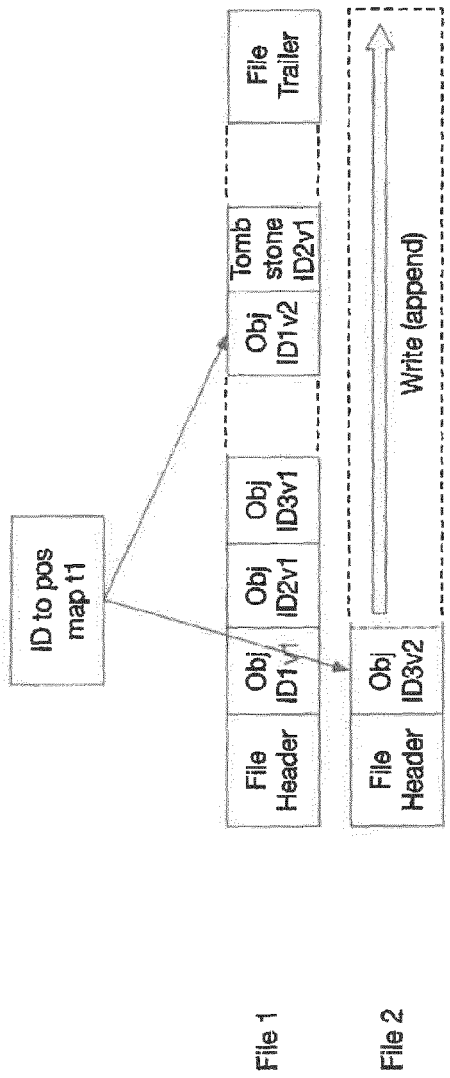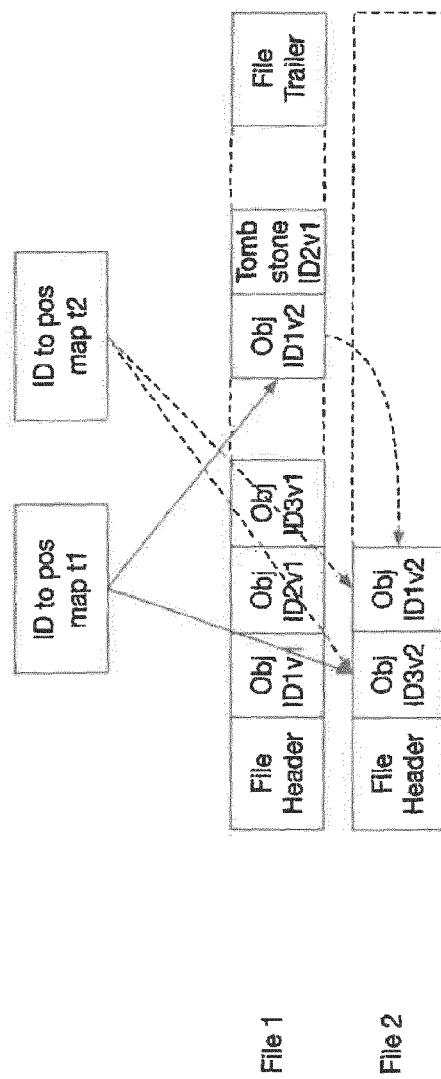
Fig. 3a Prior Art
Fig. 3b Prior Art

EFFICIENT IN-MEMORY MULTI-VERSION CONCURRENCY CONTROL FOR A TRIE DATA STRUCTURE BASED DATABASE

CROSS-REFERENCE TO RELATED APPLICATIONS

This application is a divisional of U.S. application Ser. No. 17/277,238 filed Mar. 17, 2021, which is a National Phase of International Application No. PCT/EP2019/074932 filed Sep. 18, 2019, which claims priority to European No. 18195454.6 filed Sep. 19, 2018, the entire contents of each of which are hereby incorporated by reference.

Reference is made to the international patent application PCT/EP2018/056592, which is incorporated herein in its entirety by reference.

TECHNICAL FIELD OF THE INVENTION

The present invention relates generally to the efficient use of trie data structures in databases and information retrieval systems for multi-version concurrency control (MVCC) including version storage, garbage collection and index management.

BACKGROUND OF THE INVENTION

Multi-version concurrency control (MVCC) is a popular transaction management scheme in database management systems (DBMSs). It typically increases parallelism while maintaining the desired serializability during transaction processing. Multi-versioning allows multiple read-only transactions to concurrently access current or older versions of records—even consistent snapshots of multiple records—without preventing write transactions from simultaneously generating newer versions.

To support MVCC, a database has to maintain multiple physical versions of each object. In relational databases these objects are the tuples (records), in document-oriented databases these would be the documents, in key-value databases the objects would be the (opaque) values. By using MVCC, an update to an object does not override the object or parts of it with new data but creates a new version of said object.

By using MVCC several difficulties occur, which are related to how storing of multiple versions is performed, how the right version during a read access is found (version storage) and how versions that become obsolete and will never be read again are removed (garbage collection). Also, as databases require indexes in order to improve query performance, a further difficulty lies in how to realize MVCC aware index updates and how to perform queries using indexes (index management).

The concurrency control protocol coordinates the execution of concurrent read and write transactions. The version that each transaction sees or has access to depends on the isolation level implemented by the MVCC. A common isolation level implemented is snapshot isolation, where a transaction has access to a state of the data as it has been when the transaction started. The following description focuses on snapshot isolation.

Version Storage

FIG. 1A illustrates different version storage schemes for storing multiple versions.

In an append-only schema 101, 102, for updates, an object will be copied, modified and the new version will be appended to the storage space. A chain of versions has to be maintained for each object. The drawback of this approach is that a potentially long chain has to be traversed to find the appropriate version. Obsolete versions must be pruned frequently to keep up the performance. The head version of this chain could be the oldest or newest version depending on the implementation. Indexes have to be updated either during garbage collection if the head points to the oldest version or after an update if the head points to the new version. Alternatively, a double linked chain can be used, which would however cause further maintenance overhead.

A time-travel storage 103 is similar to the append-only schema, but the versions are stored in a separate time-travel storage space. In the main storage space, the master version is kept with a reference to the version chain in the time-travel storage space. For updates, a new object will be copied to the time-travel storage space. The master version could be the oldest or newest version depending on the implementation and depending on this, either the new copy in the time-travel storage space or the master version is modified by the update. Indexes point to the master version and are not affected.

With delta-storage 104, the master version is maintained in the storage location, typically the current version. Update modifications are recorded in a delta-storage, referred to as rollback segment that stores the changes to the original version or parts of it, e.g. the modified attributes of a record. This leads to higher overhead during read access as the original object has to be retrieved and the logged changes have to be applied to gain the resulting object version.

All variants described above create a chain of object versions, wherein either the current object version or the first still kept version is the head of the chain and the index always only points to one version of the object.

Garbage Collection

As a transaction creates new object versions during updates with MVCC, the space of obsolete versions has to be reclaimed so that the system does not run out of space. Also, as mentioned above, keeping too many versions may decrease performance in some cases.

First, the garbage collection needs to be able to detect obsolete versions. An object version is obsolete if it has been superseded by a newer (current) version and there is no active transaction where the old version is still visible—in the case of snapshot isolation. This can be detected by having monotonously increasing IDs for each transaction, where each superseded object is marked with the ID of the transaction that replaced it. All objects with a replacement-ID less than any ID of all active transactions can be removed and its storage space can be reclaimed.

Depending on the version storage scheme, the objects have to be unlinked from the chains, copied and the index has to be updated. Then the physical space can be reclaimed. For an in-memory database this leads to the question of memory management in general.

The common approach to perform the garbage collection is by routine "vacuuming". Background threads regularly scan the database for expired object versions. However, scanning the whole database does not scale to larger databases. To mitigate this, transactions mark or register objects that have been replaced and the garbage collection just considers these objects and verifies if they are obsolete.

Index Management

According to Yingjun Wu, Joy Arulraj, Jiexi Lin, Ran Xian, and Andrew Pavlo. 2017. An empirical evaluation of in memory multi-version concurrency control. Proc. VLDB Endow. 10, 7 (March 2017), 781-792. DOI: https://doi.org/10.14778/3067421.3067427>MVCC database management systems according to the prior art keep the database's versioning information separate from its indexes. This implies that the existence of a key in an index means that some version exists with that key, but the index entry does not contain any information about the version.

Therefore, an index lookup will never result in false negatives, as there is always some version for the key, but it may result in false positives, as the index can point to a version for a key that is not visible to a particular transaction. This imposes an overhead hurting the performance as the results of queries using an index must be filtered in order to remove the false positive matches.

FIG. 1B shows two common approaches of how indexes reference objects: Using logical pointers 111 and using physical pointers 110. An index using logical pointers uses an indirection layer that maps a fixed object identifier (object ID) to the physical object storage. Depending on the version storage this is the head of the version chain or the master version. This approach avoids the problem of having to update all indexes to point to a new physical location whenever changes occur.

SUMMARY OF THE INVENTION

One or more of the aforementioned objects are achieved by the subject matter of the independent claims. Preferred embodiments are subject of the dependent claims.

A first embodiment of the invention is a computer-implemented method for determining, in an electronic database application or information retrieval system, a storage location of a database object of a specific version, wherein indexes for each version of the database object are stored in a trie having a root node corresponding to the specific version, the method comprising, determining a trie corresponding to the specific version by accessing the root node of the trie corresponding to the specific version; determining an object identifier of the database object by traversing the trie corresponding to the specific version using a secondary key related to the database object as search key; determining the storage location of the database object by traversing the trie corresponding to the specific version using the determined object identifier as search key.

According to a 2nd embodiment, in the first embodiment, the information whether a search key is an object identifier, or a secondary key related to a database object, is comprised in the search key.

According to a 3rd embodiment, in any one of the preceding embodiments, a secondary key comprises information regarding one or more properties encoded in the secondary key.

According to a 4th embodiment, in the 3rd embodiment, the one or more properties encoded in the secondary key comprise one of a name, an address, etc.

According to a 5th embodiment, in any one of the preceding embodiments, wherein indexes are defined as having a key and a value.

According to a 6th embodiment, in any one of the preceding embodiments, a first index is defined by having the secondary key as key and the object identifier as value, and wherein a second index is defined by having the object identifier as key and the storage location of the database object as value.

According to a 7th embodiment, in any one of the preceding embodiments, the trie having a root node corresponding to the specific version is created by creating a new root node for the specific version, copying and modifying the nodes that have been amended with regard to the nodes of a previous trie having a root node corresponding to the previous version, and creating references pointing to the nodes in the previous trie that have not been amended.

According to an 8th embodiment, in the 7th embodiment, creating the trie having a root node corresponding to the specific version is performed during a transaction and the specific version is associated with the transaction.

According to a 9th embodiment, in the 8th embodiment, wherein the transaction is identified by a transaction identifier.

A 10th embodiment of the invention is a computer-implemented method for identifying unused memory to be freed that is occupied by trie nodes of one or more tries comprising database indexes of an electronic database application or information retrieval system, wherein the method comprises: storing an array comprising one or more chunks, wherein a chunk is configured to store a trie node, and wherein the array comprises at least a first chunk containing a first trie node; storing a free chunk list indicating which chunks of the array are free to store a new trie node; while updating the first trie node during a first transaction, determining if the first trie node has been created during the first transaction; adding the first chunk containing the first trie node to the free chunk list depending on the result of the determination.

According to an 11th embodiment, in the 10th embodiment, if it is determined that the first trie node has been created during the first transaction, the method further comprises: adding the first chunk containing the first trie node to the free chunk list.

According to a 12th embodiment, in any one of the 10th to 11th embodiments, wherein the determining if the first trie node has been created during a second transaction, and if it is determined that the first trie node has been created during a second transaction prior to the first transaction, adding the first chunk containing the first trie node to a pending free chunk list.

According to a 13th embodiment, in the 12th embodiment, the adding of the first chunk containing the first trie node to the pending free chunk list comprises generating a list entry in the pending free chunk list that is associated with the first transaction and contains a reference to the first chunk.

According to a 14th embodiment, in the 13th embodiment, the list entry in the pending free chunk list that is associated with the first transaction allows referencing all chunks that have been created during one or more transactions prior to the first transaction and have been updated during the first transaction.

According to a 15th embodiment, in the 14th embodiment, the referencing of all chunks that have been created during one or more transactions prior to the first transaction and have been updated in the first transaction is realized with a pointer associated with the first transaction pointing to a chain of chunks that have been created during one or more transactions prior to the first transaction and have been updated in the first transaction.

According to a 16th embodiment, in any one of the 12th to 15th embodiments, the method further comprises: storing a transaction list containing active database transactions; determining if the pending free chunk list comprises one or more entries associated with a transaction that is older than the oldest transaction in the transaction list; if it is determined that the pending free chunk list comprises one or more entries associated with a transaction that is older than an oldest transaction in the transaction list, moving the chunks associated with the one or more entries to the free chunk list.

According to a 17th embodiment, in any one of the 10th to 16th embodiments, each chunk comprises a payload value and a value identifying the transaction during which it is created.

According to an 18th embodiment, in any one of the 10th to 17th embodiments, updating the first trie node during a first transaction comprises creating a second trie node as a copy of the first trie node with updated values.

According to a 19th embodiment, in any one of the 17th to 18th embodiments, updating the first trie node during a first transaction comprises creating a second chunk containing the second trie node, wherein the value identifying the transaction during which the chunk is created corresponds to the first transaction.

According to a 20th embodiment, in any one of the 17th to 19th embodiments, the value identifying the transaction during which a node is created is a transaction identifier.

According to a 21st embodiment, in the 20th embodiment, the determination if the first trie node has been created during the first transaction is performed by comparing the transaction identifier of the first transaction with the transaction identifier of the first chunk.

According to a 22nd embodiment, in any one of the 20th to 21st embodiments, the determination whether a transaction is older than the oldest transaction in the transaction list is performed by comparing transaction identifiers, wherein an older transaction has a lower transaction identifier than a newer transaction.

According to a 23rd embodiment, in any one of the 10th to 22nd embodiments, the array further comprises free space not occupied by chunks.

According to a 24th embodiment, in any one of the 10th to 23rd embodiments, each node on the array is stored as a long integer.

According to a 25th embodiment, in any one of the 10th to 24th embodiments, each node in a trie is referenced by a pointer comprising an index of the node in the array.

According to a 26th embodiment, in any one of the 10th to 25th embodiments, the size of the array is limited.

According to a 27th embodiment, in any one of the 10th to 26th embodiments, the one or more chunks comprise chunks having different sizes and chunks having the same sizes, wherein each chunk of a different size is referenced by a pointer stored in the free chunk list and wherein the chunks referenced by a pointer stored in the free chunk list comprise pointers to chunks of the same size as themselves.

According to a 28th embodiment, in the 27th embodiment, the one or more chunks comprise chunks of 64 different sizes.

According to a 29th embodiment, in any one of the 27th to 28th embodiments, the different sizes are associated with the number of pointers contained in each node pointing to child nodes.

According to a 30th embodiment, in any one of the 27th to 29th embodiments, chunks of the same size are linked to each other by pointers.

A 31st embodiment of the invention is a computer-implemented method for identifying unused memory to be freed occupied by trie nodes storing database indexes of an electronic database application or information retrieval system, wherein the method comprises: storing one or more arrays and an active array configured to store trie nodes, wherein each trie node is associated with a current trie root node corresponding to a current transaction and/or one or more previous trie root nodes corresponding to previous transactions; and performing, during an eviction transaction, the following steps of: determining if one of the one or more arrays meets a criterium, if it is determined that one of the one or more arrays meets the criterium, selecting the array that meets the criterium; if the selected array contains one or more nodes that are associated with the current trie root node, copying the one or more nodes of the selected array that are associated with the current trie root node to the active array; identifying the memory occupied by the selected array as unused memory to be freed, wherein copying of the one or more nodes of the selected array that are associated with the current trie root node to the active array comprises:

traversing nodes associated with the current trie root node, while traversing the nodes, copying nodes that are stored in the selected array, and ignoring nodes that are not stored in the selected array, and not traversing nodes and child nodes of nodes stored in an array that has been created before the selected array.

According to a 32nd embodiment, in the 31st embodiment, copying of the one or more nodes of the selected array that are associated with the current trie root node to the active array further comprises: while traversing the nodes associated with the current trie root node, simultaneously traversing nodes associated with a previous trie root node that has been created after the selected array was the active array, comparing nodes associated with the current trie root node with nodes associated with the previous trie root node level-by-level from top-to-down, if it is determined by the comparison that a node is associated with the current trie root node but is not associated with the previous trie root node, not traversing said node and child nodes of said node.

According to a 33rd embodiment, in the 32nd embodiment, the previous trie root node that has been created after the selected array was the active array is the first trie root node that has been created after the selected array was the active array.

According to a 34th embodiment, in any one of the 32nd to 33rd embodiments, the comparing of nodes associated with the current trie root node with nodes associated with the previous trie root node level-by-level from top-to-down comprises comparing the references to child nodes of the nodes.

According to a 35th embodiment, in the 34th embodiment, the references to child nodes of the nodes are compared by an AND operation.

According to a 36th embodiment, in the 35th embodiment, the references to child nodes of the nodes are indicated by bitmaps and the comparison is performed by a bitwise AND operation.

According to a 37th embodiment, in any one of the 31st to 36th embodiments, the method further comprising: prior to identifying the memory occupied by the selected array as unused memory to be freed, determining if the selected array contains one or more nodes associated with one or more previous trie root nodes being used in one or more pending transactions, if it is determined that selected array contains one or more nodes that are part of one or more previous trie root nodes being used in one or more pending transactions, waiting until the pending transactions are terminated.

According to a 38th embodiment, in the 37th embodiment, the determination if the pending transactions are terminated is performed by comparing the pending transactions with the eviction transaction, and if it is determined that the pending transactions do not contain a transaction older than the eviction transaction, determining that the pending transactions are terminated.

According to a 39th embodiment, in any one of the 31st to 38th embodiments, the active array is an array as defined in the 10th to 30th embodiments.

According to a 40th embodiment, in any one of the 31st to 39th embodiments, the method further comprises: prior to copying the one or more nodes of the selected array that are part of the of the current trie root node to the active array, determining if the active array has sufficient free space to encompass the node; if it is determined that the active array does not have enough free space, creating a new array that becomes the active array and the previous active array becomes one of the one or more arrays.

According to a 41st embodiment, in any one of the 31st to 40th embodiments, the active array and the one or more arrays have a limited size.

According to a 42nd embodiment, in any one of the 31st to 41st embodiments, the criterium comprises the number of transactions currently using an array and/or the number of nodes of one or more previous tries contained in an array.

According to a 43rd embodiment, in any one of the 31st to 42nd embodiments, the criterium comprises the amount and size of the nodes in an array that have been superseded.

According to a 44th embodiment, in any one of the 31st to 43rd embodiments, each node in a trie is referenced by pointer comprising a reference to a respective array and an index of the node in the array.

A 45th embodiment of the invention is a computer program, in particular a database application or information retrieval system program, comprising instructions for performing the method of any one of 1st to 44th.

A 46th embodiment of the invention is a data-processing device or system comprising one or more processors and memory, the data-processing device or system being configured to perform the method of any one of 1st to 44th embodiments.

A 47th embodiment of the invention is a preferably non-transitory computer readable medium having stored thereon the computer program of the 45th embodiment.

DESCRIPTION

Brief Description of the Drawings

FIGS. 3a and 3b show the basic principle of how version storage garbage collection can be accomplished according to the prior art.

DETAILED DESCRIPTION

To support MVCC, a database has to maintain multiple versions of each object.

Figure 1A:
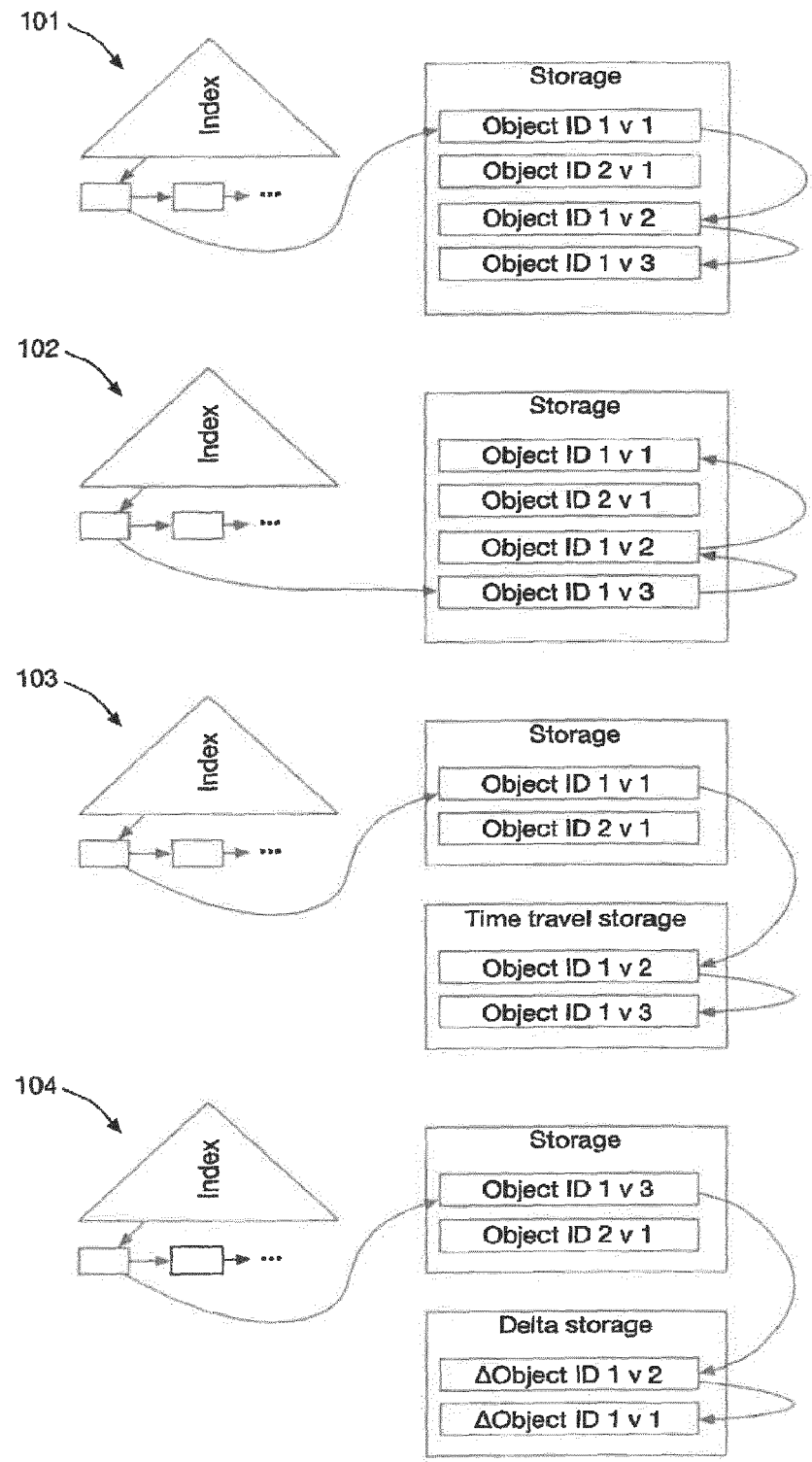
FIG. 1A illustrates different version storage schemes for storing the multiple versions.
Figure 1B:
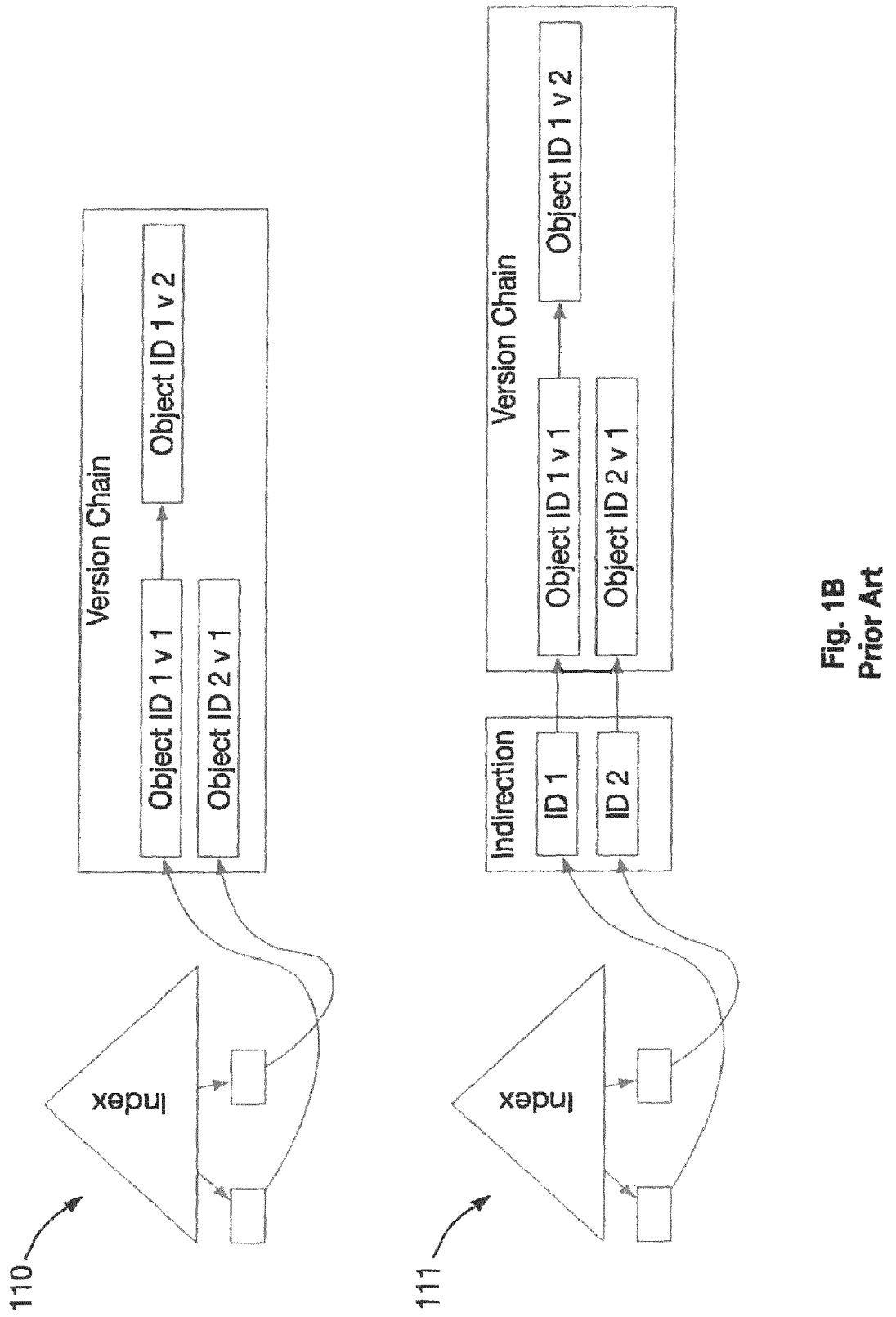
FIG. 1B shows two common approaches of how indexes reference objects.
Figure 2:
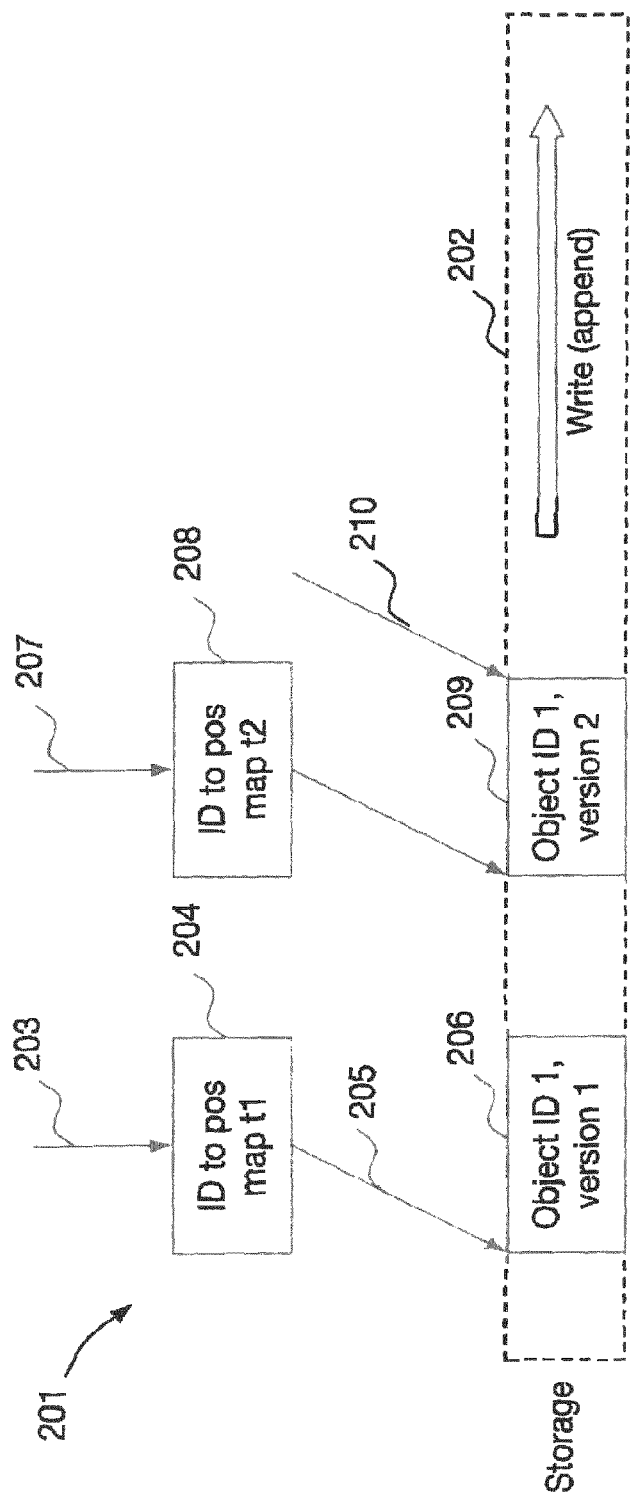
FIG. 2 illustrates a logical pointer approach according to the prior art.

FIG. 2 shows a logical pointer approach according to the prior art, where pointers for a specific object ID and a specific version are mapped to a physical location of the object in a storage.

In the embodiment shown in FIG. 2, objects 206, 209 are stored in a persistent storage 202, which can be one or more files and/or persistent memory. To store the objects, a log structured storage concept is applied. This means that new objects are appended after a last used position 210 of the storage 202.

Every object is identified by a primary key or ID, e.g. a record ID or document ID in case of relational or document-oriented databases. An ID-to-physical-location map (index) is used to derive the physical position of the object in the storage 202 for a given ID. An index is defined as key/value pair throughout this description.

In the embodiment of FIG. 2, objects can be modified by transactions. If an object is to be modified in a transaction, a copy of the object is created, and the amendments are performed on the copied object. The original object is not amended or overwritten.

Every transaction that modifies or creates an object creates a new version of the created or modified object and a new version of the ID-to-physical-location map to derive the physical position of the object in the storage 202.

As shown in FIG. 2, there is a first object 206 with an Object ID "1" and a second object 209 also having the object ID "1". The first object is a first version and the second object is a second version of the object. As mentioned above, when an object is modified, a copy of the object is created, and the copy of the object is modified. Therefore, the storage 202 comprises two versions of the object.

Also, such modification leads to two versions of the ID-to-physical-location map, namely 204, and 208. A lookup for first version "version 1" of the object with object ID "1" can be realized by using a pointer 203 pointing to map 204, which will lead to the storage position 205 of the first version of the object. A lookup for the same object ID but for the second version "version 2" can be realized by using a pointer 207 pointing to map 208 corresponding to a later or newer transaction that will lead to the storage position of the second version of the object 209.

It is important that map 204 is still accessible as long as there are pending transactions using the corresponding snapshot view (the version referenced by the pointer 203) and corresponding object versions.

FIG. 3a and FIG. 3b show the basic principle of how version storage garbage collection can be accomplished according to the prior art.

In the example of FIG. 3a and FIG. 3b, every file is limited to a predetermined file length or size. If, during appending new data, the length of the file is reached, a new "active" file to write to is created and the old file is no longer modified.

FIG. 3a shows a starting situation for garbage collection. Such example may comprise two files, file 1 and file 2, having different objects, wherein file 1 has reached its length limit and file 2 has still space to append to and is thus the active file. File 1 stores three objects having different object IDs. The object with object ID 1 stores two versions (v1 and v2) and thus two objects in the file. The object with object ID 2 stores a first version (v1) and a tomb stone indicating that the object has been deleted in the file. File 2 contains the latest version of the object with object ID 3. The current versions of the objects are referenced by "ID to pos map t1". "t1" indicates that it is the map of a transaction with a transaction id 1.

FIG. 3*b* shows how the garbage collection for the version storage works in principle. A copying garbage collection method (eviction) is applied. The first step is to "clean" file 1, which means that if the file contains current versions of objects, which are still used and referenced by the current map "ID to pos map t1", they must be transferred to the active file. Therefore, the file is scanned and a look up, e.g. by using the object ID, is performed in the current ID-to-physical-location map "ID to pos map t1" comprising the physical positions of the latest version of the objects.

If this location retrieved from the look up is still the same as the position derived from the file scan, the object is copied (written) to the active file, namely file 2. In the example, the object with object ID 1 and version 2 needs to be copied from file 1 to file 2. The object with object ID 1 and version 1 can be ignored as the map contains an object with the same ID but in a newer version. Thus, the location retrieved from the scan is different from the location in the file scan. Also, the object with object ID 2 and version 1 can be ignored as it has been deleted and does not appear in the map at all. The object with object ID 3 does not need to be copied as the latest version is not in file 1 but already in the active file 2.

To know which object version store files are suitable candidates for eviction (also called garbage collection in this application), statistics are maintained for each file. Such statistics may comprise the amount and size of the objects that have been replaced by newer versions or have been deleted. If a file contains less than a certain amount of still current object versions, it is subject to garbage collection, which means that the corresponding memory is identified as memory to be freed. Such memory can then be rewritten or overwritten by other data. In case of a file that is has memory to be freed, the file can be deleted. Before deleting the file, it has to be verified that there are no more pending transactions that still need access to the file, e.g. reading data from the versions stored in the file.

The model described in FIGS. 3*a* and 3*b* would require creating a new, modified copy of the map with each transaction. Such map creation would be infeasible inefficient, as the creation would consume a lot of additional memory space and processing time.

The goal of this invention is to provide a space and performance efficient persistent data structure for storing such a map. A persistent data structure is a data structure that always preserves the previous version of itself when it is modified.

The solution is achieved by extending the trie described in the international patent application PCT/EP2018/056592 to act as a space and performance efficient persistent data structure.

Tree-based structures can easily be used as persistent data structures by creating a partial copy of the tree for each modification up to the root node.

Figure 4:
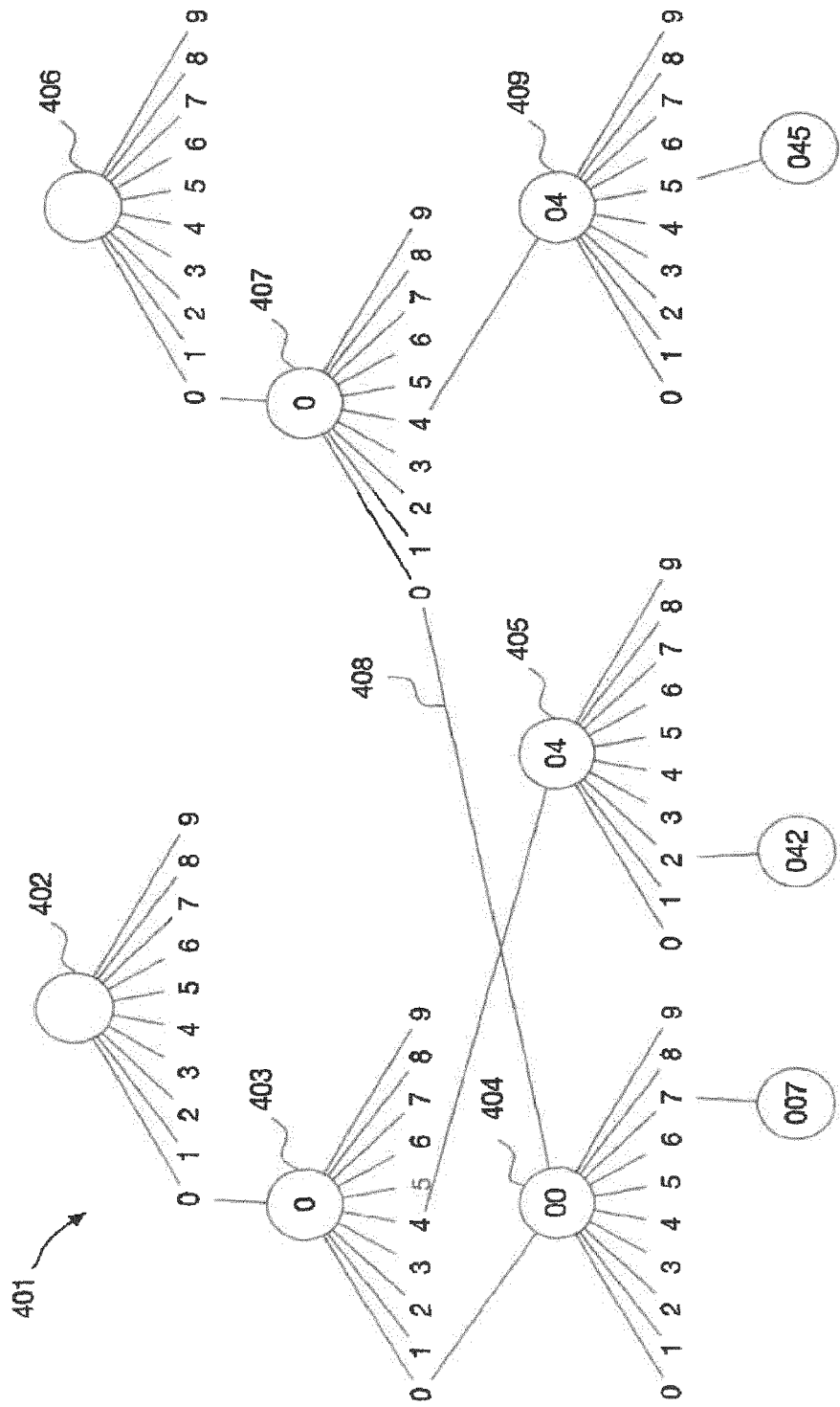
FIG. 4 illustrates the copy-on-write approach for a trie with an example showing two tries with two different trie root nodes.

FIG. 4 illustrates the copy-on-write approach for a trie with an example showing two tries with two different trie root nodes.

Before the modification, trie structure 401 contains two tries with trie root nodes 402 and 406. Both trie root nodes 402 and 406 correspond to two different versions, which could for example be created during two different transactions. The first trie referenced by the trie rood node 402 comprises the keys "007" and "042", which are encoded by the child nodes 403, 404 and 405.

The removal of the key "042" and addition of the key "045" in one transaction results in a second trie referenced by the new trie root node 406. Changed nodes are copied and modified. Node 407 is the modified copy of node 403 and node 409 is the modified copy of node 405. The unchanged node 404 is referenced 408 by the new node 407.

Typically using logical pointers is quite expensive as typical persistent map implementations using trees for example have a O(log n) access time complexity. A trie has a constant O(1) time complexity, as the access time is independent of the amount of entries in the map.

Based on an inventive combination of the approaches described so far, the invention solves many issues mentioned in the introduction. The issue regarding how to store multiple object versions and how to find the right version during read access (snapshot isolation) is resolved by using the current root pointer of the trie at the time of transaction start throughout the whole transaction.

Further the inventive combination of the described approaches enables queries to use indexes that would also be MVCC aware. This has the advantage that secondary indexes that point to the object identifier (ID) are also versioned. This concept will be described in more detail with regard to FIG. 5.

Figure 5:
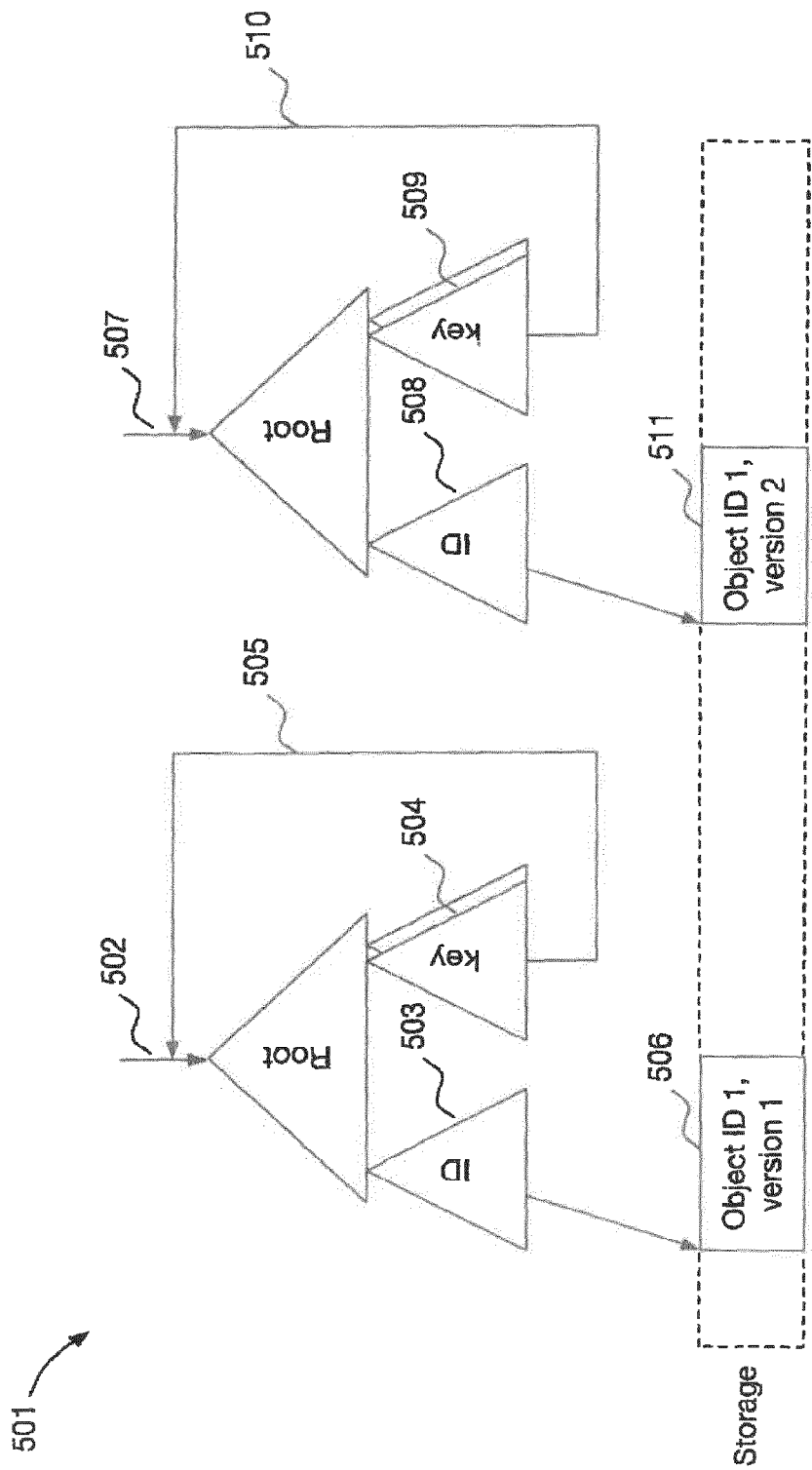
FIG. 5 illustrates an embodiment implementing logical pointers and the copy-on-write approach for the secondary indexes according to the invention.

FIG. 5 shows an embodiment implementing logical pointers and the copy-on-write approach for the secondary indexes according to the invention.

In the embodiment of FIG. 5, the logical pointers and the copy-on-write approach for the secondary indexes are realized by storing the ID-to-physical-location map trie index 503, 508 and other secondary index tries 504, 509 in one combined physical trie. This is achieved by using the composite key capability of the trie as described in detail in the international patent application PCT/EP2018/056592.

The information whether a composite key (also called "search key" in this application) is an object identifier (ID), or a secondary key related to a database object, is comprised in the search key.

The root of this combined trie provides a consistent (snapshot) view of the object versions. The objects are also sometimes referred to as database objects as such objects may maintained in a database and created and amended by database transactions. In order to access an object using a secondary key, the secondary key 504 is used to derive the object ID 505 and then the object ID 505 is used to determine the physical object position. Modifying a trie referenced by trie root node 502 in a transaction results in a new partial copy of the trie with a new trie root node 507 that again provides a consistent view of all object versions and indexes.

This approach solves the version storage, object garbage collection and index management drawbacks of current solutions.

As mentioned above, with regard to the prior art, the search index and the indirection layer (logical to physical mapping) are typically different data structures. Generally, in such separated structures, the index points only to one version, which may or may not be the requested version. In case the version referenced by the index is not the requested version, a version chain must be traversed to find the requested version. The "requested version" may also be called "visible version" as it is the version that should correctly be visible for the transaction requesting the object.

The invention solves the drawback of additionally traversing version chains by combining the indirection layer and search index into one physical trie which is always snapshot consistent.

To give an example, an object with logical ID "1" with two versions "1" and "2" are considered. The first version is stored at physical location 506 and the second version is stored at physical location 511.

In addition, there may be a search index on the property "name" of the object. The first object version contains the value "Peter" as name and the second object version contains a changed value, namely the name "Matt".

With the capability of compound keys, the trie denoted by root note 402 then would contain the following two entries, "ID-Map, 1, 506" and "Name, 'Peter', 1". The first entry corresponds to the ID-to-physical storage location 503 and the second entry corresponds to the secondary key 504. After the update, the trie referenced by trie root node 507 would contain "ID-Map, 1, 511" and "Name, 'Matt', 1".

So, the secondary key allows searching for the property "name" with the value "Peter" and returns the object ID "1". Then the trie is traversed by using the object ID "1" to find the physical storing location "56". Thus, the indirection layer (logical to physical mapping) is just another search index within the bunch of search indexes that the trie contains. Note that the ID-Map and Name of the first key part could be physically stored as Strings or an integer (enumeration) in the trie, e.g. ID-Map could be "1" and Name could be "2", which would result in the following entries: "1, 1, 506" and "2, 'Peter', 1". It should also be noted that there may be several parameters in a same key, e.g. "name, 'Peter', age, 30, 1". Also, as already mentioned above, the trie may comprise different secondary keys. So, there may also be a key "age, 30, 1" comprised in the same trie.

It should be noted that the example presented above is a mere illustration of the principle and the scope of protection is not to be limited to the specific values and parameters.

A further objective of the present invention lies in providing a practical, usable and efficient multi-version trie with efficient node allocation and deallocation and thus resolve the aforementioned issue of how versions that become obsolete and will never be read again are removed (garbage collection).

The prior art is silent on how to perform node allocation and deallocation efficiently. The prior art does neither disclose how allocation and deallocation could be performed in general nor how garbage collection of obsolete nodes and their physical space while supporting multiple versions could be performed.

The copy-on-write approach for the trie, as described above, leads to ever increasing memory demand. Thus, a solution is needed to discard obsolete nodes and reclaim their space in the trie.

Figure 7:
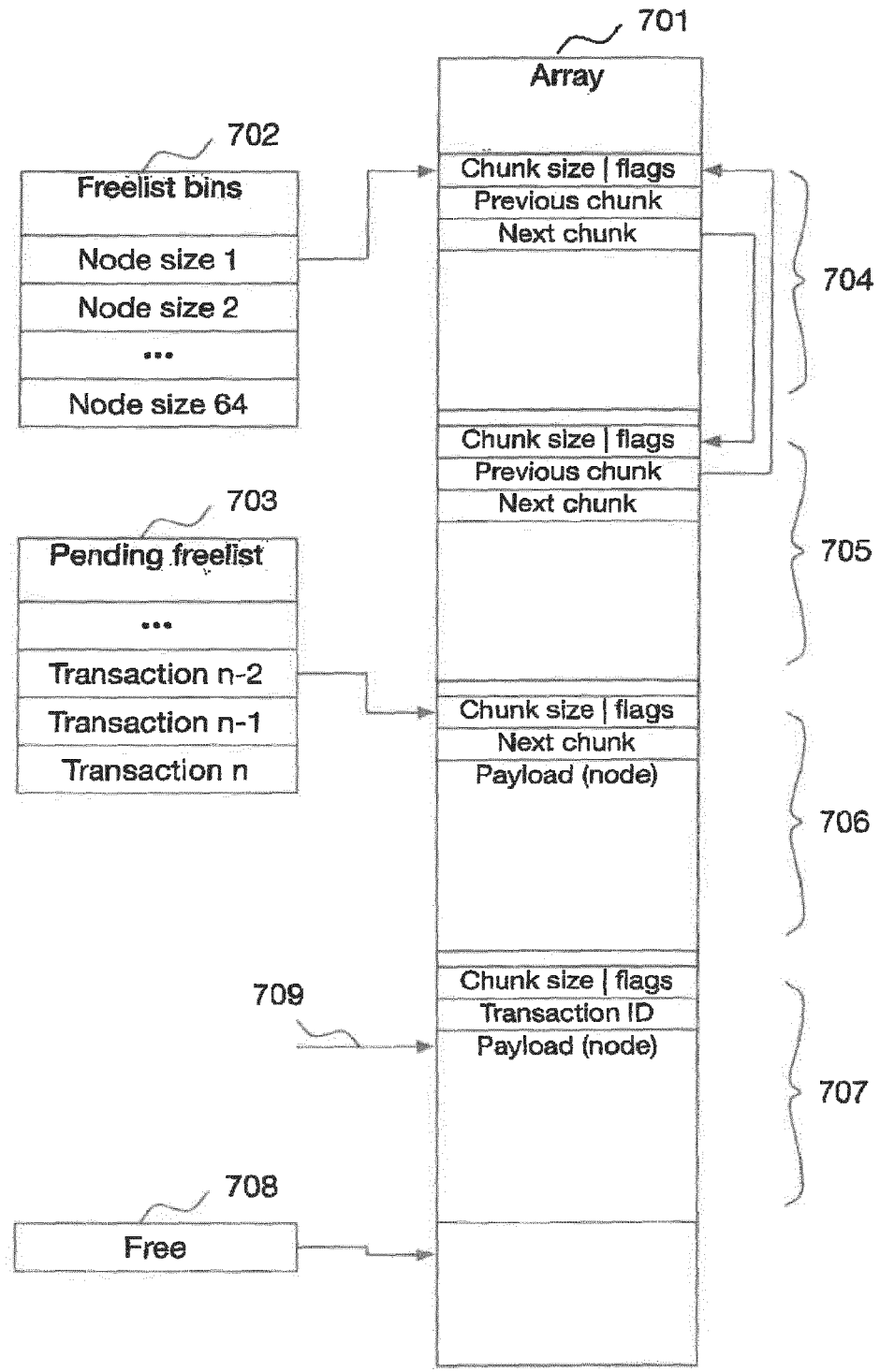
FIG. 7 shows trie memory management according to the invention.

As also disclosed in the international patent application PCT/EP2018/056592, a first aspect is to store nodes in an array, instead of allocating nodes separately in memory (cf. also FIG. 7). The nodes may be stored in an array of long integers, and instead of having memory pointers for nodes. In such example, a current node may be specified by an index into this array. A child pointer may be an index of the node position in the array. When traversing the trie, the offset to find the index of a child node based on the current node index may then be determined based on the space occupied by the current node. The child node may follow the current node and may thus be stored next to (or behind) the current node in the array. With regard to the node structure described in the international patent application PCT/EP2018/056592, a position of the child node in the array may be the amount of least significant bits set in the bitmap before the target position plus one for the bitmap.

Figure 8:
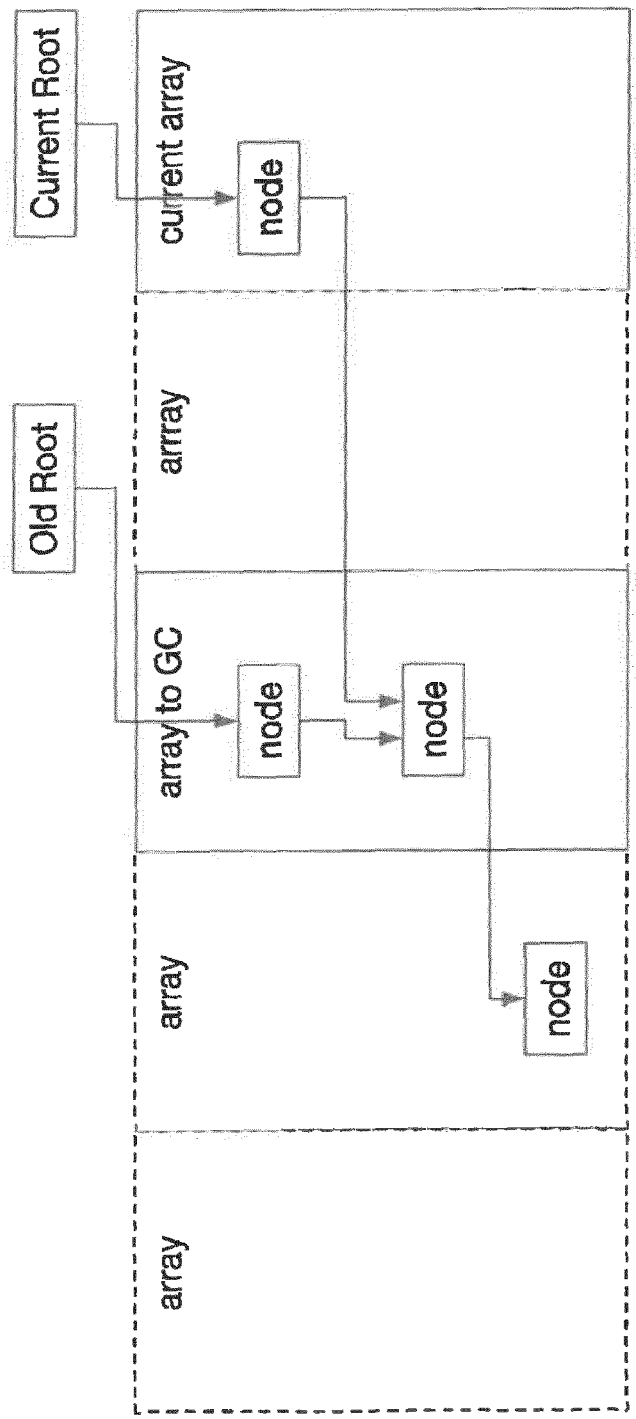
FIG. 8 illustrates an embodiment for efficiently performing garbage collection of multiple arrays according to the invention.

Preferred embodiments work with several such arrays (cf. also FIG. 8). In such case, a pointer to a node may comprise two parts. A first part, e.g. a lower part of the pointer may be an index within the array, and a second part of the pointer, e.g. the higher part is a reference to the array. Using several arrays may be required due to memory management reasons, as it is not always possible to allocate an array of arbitrarily large size. For example, in Java, the size of an array is limited to 32-bit integers, which results in an array size of $2^{31}$ (only positive values)=2,147,483,648 entries. However, many real-world applications require arrays comprising even more entries.

Classic memory allocation and deallocation methods as known in the art do not consider multiple versions. This is illustrated by the example of glibc-malloc—a well-known library to manage allocated memory in the application's address space, which is described briefly with regard to FIG. 6.

Figure 6:
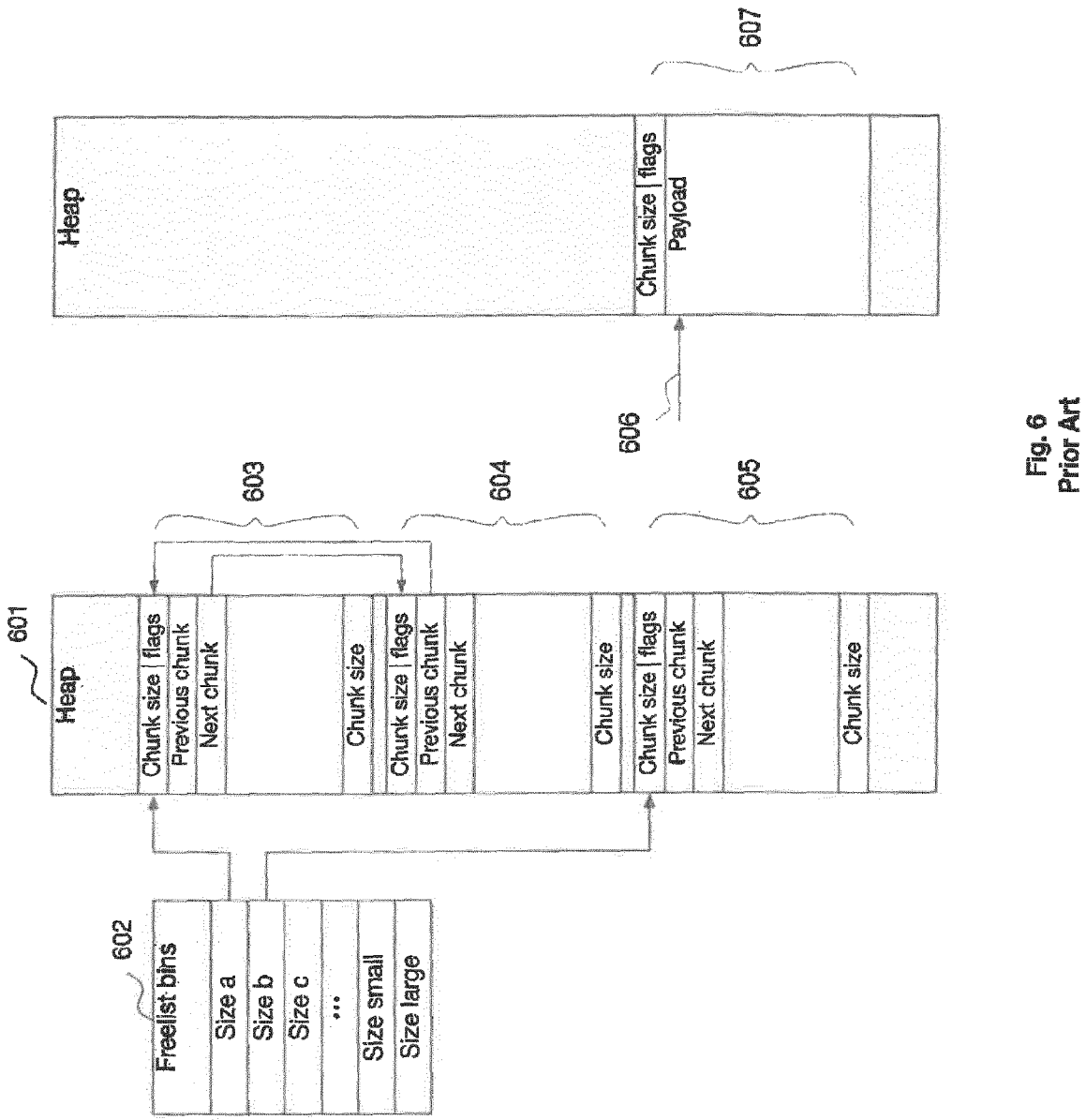
FIG. 6 shows the example of glibc-malloc according to the prior art.

FIG. 6 shows the example of glibc-malloc according to the prior art. In glibc-malloc memory is partitioned into chunks from a larger region of memory called "heap" 501. Unused (free/available) chunks are linked into a chain. To allocate a certain amount of memory for an application, a suitable unused chunk has to be found. If a free chunk with the requested size is not available, a larger free chunk is selected and split into parts which causes so called memory fragmentation. The goal therefore is to find a suitable sized unused chunk.

Finding a suitable sized chunk would be expensive if there is only one chained list. Therefore, there are bins (freelist bins) 602 that chain chunks with certain sizes (603, 604 for size a and 605 for size b). As an example, if a chunk 605 would be of the correct size b for an allocation request, the chunk is unlinked from the free list chain and a pointer 606 to the available payload 607 is returned. The pointer 606 is the memory pointer returned to the application, but the chunk still has a header that contains size and other memory management information. For example, the chunk may have a flag indicating whether a chunk is free or used.

When deallocated by the application, the chunk is returned to the appropriate chain of unused chunks. To reduce fragmentations, so called coalescing takes place, which means that adjacent chunks are combined to larger chunks.

FIG. 7 shows trie memory management according to the invention.

The following aspects need to be taken into account when implementing trie memory management. Updating a trie during a transaction requires the allocation of space for new nodes or—as part of the copy-on-write strategy to copy and modify existing nodes. The memory space for existing nodes cannot be reclaimed immediately as pending transactions still need to be able to access them.

As mentioned above and described in the international patent application PCT/EP2018/056592 nodes may be kept in multiple arrays. The embodiment shown in FIG. 7, illustrates trie memory management based on a single array 701.

In the embodiment shown in FIG. 7, each node of the trie may be stored in a respective chunk 703, 705, 706 and 707. Each chunk that is not free and thus contains a node comprises a payload value comprising the node 706, and a value identifying the transaction during which it is created (cf. Transaction ID in FIG. 7).

To allocate space for a trie node the freelist bins (also referred to as "free chunk list") 702 are checked first. There may be different nodes having different sizes stored in a trie. Examples of different nodes are described in detail in the international patent application PCT/EP2018/056592. Such examples may comprise a regular node with a corresponding bitmap and pointers, chained optimized nodes or terminal optimized nodes.

If there is no free chunk of the requested size in the freelist bins 602, the bins are checked for a free chunk with double size. If a chunk with double size is found, the free chunk with double size is split into two chunks.

As regular nodes have 1 to 64 children empirical tests showed, that having 64 bins with corresponding sizes (64 different chunk sizes) is a suitable and efficient approach. The array is filled consecutively and a free-pointer 708 points to the next available free space to allocate further chunks. Thus, if free chunks are not available through the freelist bins ("free chunk list") 702, allocation appends new chunks for respective nodes at the location indicated by the free-pointer 708.

In a preferred embodiment of this invention, the arrays are (again—as the version storage) stored durable using memory mapped files. To accomplish this, the array needs to be periodically written to a file. It would hurt the performance badly, if every change to the trie is written to the persistent storage immediately. However, a system crash leads to an inconsistent state, because the trie is not stored after each modification. In order to avoid inconsistent states, the following crash recovery process is applied. The last saved state of the trie and the object store—which acts as write ahead log—is read and all changes present in the object store are applied to the last persisted version of the trie.

Note that the data structure and algorithms described in PCT/EP2018/056592 use the index pointer to the payload 709 and are not aware of the header information of the chunk 707 that maintains the chunk size and transaction information.

As mentioned above, it is an objective of the present invention to provide a practical, usable and efficient multi-version trie with efficient node allocation and deallocation. However, allocation and deallocation techniques known in the art, cf. glibc-malloc, do not take into account different versions of objects and may therefore not decide based on transaction information, whether or not a chunk containing a node may be deallocated.

During a transaction the following trie operations may occur:

A new trie node may be created:

In this case, a chunk of the size required for the new node may be selected, and the node will be stored in this chunk. The chunk selected to accommodate the new node will be removed from the list of free chunks (freelist bins) 702. As mentioned above, if there is no free chunk of the needed size available, a new chunk needs to be allocated first. Each chunk contains header information, e.g. its size, pointers to other chunks and a transaction identifier that amended the chunk by storing a node in the chunk. Thus, when inserting a node into the chunk the transaction identifier that stored a node in the chunk needs to be updated.

A trie node created by a former transaction is updated:

In this case, a copy of the node may be created, and the copy may be modified. In particular, a new chunk may be created and the payload value will be adapted to contain the modified node. Also, the value identifying the transaction of the chunk (transaction ID) will be set to the transaction identifier that created the chunk.

The "replaced" node may however not be deleted immediately, as there may be pending transactions that still require access to the specific "replaced node". However, in order to be able to reuse the memory occupied by the "replaced node" as soon as possible, the node should be deallocated as soon as there are no transactions left that require the node.

In order to identify and monitor such chunk containing the "replaced node", the chunk may be added to a pending free chunk list 703 (also called "pending freelist"). For example, the pending free chunk list 703 may have different entries, wherein each entry is associated with a specific transaction and refers to chunks comprising nodes that have been replaced during the specific transaction. For example, an entry may have a reference pointing to a chain of chunks containing nodes replaced by the transaction of that entry. The chain may be realized by a linked list, where the entry points to the first chunk in the list, and each chunk points to a next chunk in the list (cf. "Next Chunk" in chunk 706). In one embodiment, as also shown in FIG. 7, the transaction ID field is replaced by a pointer to the next chunk, when a chunk is added to the pending free chunk list 703.

By keeping the chunks in the pending free chunk list 703, it is still possible to access the payload of the chunks having "replaced nodes", as the payload (node) still contains valid information to support pending transactions according to the MVCC requirements, and at the same time keep track of the nodes that should be deallocated in the near future.

If the replaced node is no longer required by pending transactions, then the chunk containing the node may be moved from the pending free chunk list 703 to the free chunk list 702 (also called "freelist bins") and is thus identified as free chunks (or as unused memory to be freed) that can be reused to accommodate new nodes.

In the preferred embodiment, such determination whether or not a node is still required by a pending transaction is not performed for each node individually, but for all nodes that have been replaced in a specific transaction. In detail, such determination may be realized by comparing the pending transactions identifiers with the identifier of the specific transaction that has replaced the nodes. Such comparison requires that the pending transactions identifiers are available and accessible to the memory management system. For example, the pending transactions identifiers may be stored in a pending transaction list. The comparison may then be achieved by determining if the pending transaction list comprises a transaction older than the specific transaction. The determination if an older transaction is contained in the pending transaction list may for example be achieved by using monotonously increasing transaction identifiers, i.e. new transactions having higher identifier numbers than older transactions. Thus, it may be determined that the pending transaction list does not contain a transaction with a transaction identifier lower than the transaction identifier of the specific transaction that replaced the nodes. If it is determined that there are no more pending transactions, all chunks associated with (or referenced by) the specific transaction are moved from the pending free chunk list 703 to the free chunk list 602. The corresponding chunks are appended to the free chunk list 702 (when the chunks are organized in a linked list, as shown in FIG. 7) according to their respective sizes.

A trie node created by the same transaction is updated:

In this case, the node can either be overwritten, if the size of the amended node will be the same as the original node, or a new node will be created, and the replaced node can immediately be returned to the free chunk list 702 as no other transactions have access to it. This case may be detected by comparing the transaction ID of the chunk containing the node to update with the ID of the transaction that updates it. If both IDs are the same, it is determined that the same transaction created the node.

When deallocating chunks, the chunks are distributed according to their sizes to the free chunk list 702. If the free chunk list 702 has no entry (bin) for a size of a specific chunk, the size of the chunk may need to be amended. If the chunk is larger than the available sizes, the chunk is split into smaller chunks. If the chunk is smaller than the available sizes, the chunk is combined with adjacent chunks. When combining with adjacent chunks (also called coalescing), the chunk flags of adjacent chunks are evaluated to verify that the chunks are unused and available for combining.

The embodiment, shown in FIG. 7, only describes memory management within a single array or epoch. However, as mentioned above, the size of an array in a programming language is usually limited. Therefore, a solution for efficiently performing garbage collection of multiple arrays and array files (epochs) is required.

FIG. 8. illustrates an embodiment for efficiently performing garbage collection of multiple arrays according to the invention.

FIG. 8 shows a plurality of arrays containing nodes from different tries. The multiple arrays result from the fact that the size of the arrays is limited. Thus, if additional nodes need to be stored, a new array needs to be created. Such new array is also called a new "epoch". When a new array is created, this array becomes the active array, which is used to store new and modified nodes of the trie. Thus, the lists, free chunk list 702 and pending free chunk list 703, mentioned above with regard to FIG. 7, are maintained for the active array.

Arrays other than the active array are considered closed and are no longer amended. If nodes are changed or added during a transaction, copies of these nodes are stored in the active array.

As shown in FIG. 8, there are several arrays in addition to the active array holding trie nodes. Each trie node is associated with a current trie root node corresponding to a current transaction and/or one or more previous trie root nodes corresponding to previous transactions. In FIG. 8, there are two trie root nodes "Old Root" and "Current Root".

In order to identify unused memory to be freed that is occupied by trie nodes of one or more tries comprising database indexes, an array to be garbage collected needs to be determined in an eviction transaction. Such determination may be based on one or more criteria. The criteria may be predefined or adapted at runtime. The one or more criteria may comprise the number of transactions currently using an array and/or the number of nodes of one or more previous tries contained in an array. Similar to the version store files, the candidate files that represent the trie arrays, that are eligible to garbage collection may also be determined by tracking the amount and size of the nodes in that file that have been superseded.

If it is determined that one of the arrays meets a criterium, said array is selected. In a next step, it needs to be determined if the selected array contains one or more nodes that are associated with the current trie root node (and therefore still used). If the selected array comprises such nodes, the nodes need to be copied to the active array, in order to preserve the nodes.

The copying of the one or more nodes of the selected array that are associated with the current trie root node to the active array comprises, traversing nodes associated with the current trie root node, and while traversing the nodes, copying nodes that are stored in the selected array, and ignoring nodes that are not stored in the selected array.

In order to accelerate the determination whether or not a node needs to be copied, child nodes of nodes stored in an array that has been created before the selected array are ignored and thus not traversed. Note that nodes can only point to nodes within the same array or into a former array but not into an array allocated later. Thus, nodes from an array that has been created before the selected array cannot point to the selected array. Avoiding these branches results in a better performance, since less nodes need to be evaluated (whether or not they are located in the selected array).

Also, while traversing the nodes associated with the current trie root node, it is possible to simultaneously traverse nodes associated with a previous trie root node that has been created after the selected array was the active array and compare nodes associated with the current trie root node with nodes associated with the previous trie root node level-by-level from top-to-down. If it is determined by the comparison that a node is associated with the current trie root node but is not associated with the previous trie root node, not traversing said node and child nodes of said node. Avoiding these nodes, may reduce the number of nodes to be traversed significantly, as nodes that are stored in arrays lying between the current array and the selected array ("array to GC" in FIG. 8) can be avoided.

In the preferred embodiment, the previous trie root node that is selected to perform the comparison may be the first trie root node that has been created after the selected array was active array, which means that the selected array was closed and no longer amended. The trie root node created immediately after this switch, may be considered the best starting point, as it may avoid most nodes being created between the selected array and the current/active array.

The aforementioned comparing of nodes associated with the current trie root node with nodes associated with the previous trie root node level-by-level from top-to-down comprises comparing the references to child nodes of the nodes. Such references may comprise bitmaps and pointers as described in detail in the international patent application PCT/EP2018/056592. In a preferred embodiment, the bitmaps are compared with a bitwise AND operator.

After the copying of the nodes, the memory occupied by the selected array may be identified as unused memory to be freed.

However, if there are pending transactions that still need access to nodes in the selected array, the identification as unused memory to be freed only occurs after all pending transactions are terminated. The eviction (garbage collection) itself is performed within a transaction. The selected array has to be kept, until all transactions that started earlier are finished. The determination if the pending transactions are terminated may be performed by comparing the pending transactions with the eviction transaction, and if it is determined that the pending transactions do not contain a transaction older than the eviction transaction, determining that the pending transactions are terminated. In other words, there is no more pending transaction with a transaction identifier smaller than the transaction identifier of the eviction (garbage collection) the array can be disposed.

If the arrays are stored on durable storage (e.g. files), the durable storage can be disposed if and only if the current array and the new root pointer after the garbage collection transaction have been flushed reliably to the durable storage. Note that for performance reasons a flush is not performed for each individual transaction.

Figure 9:
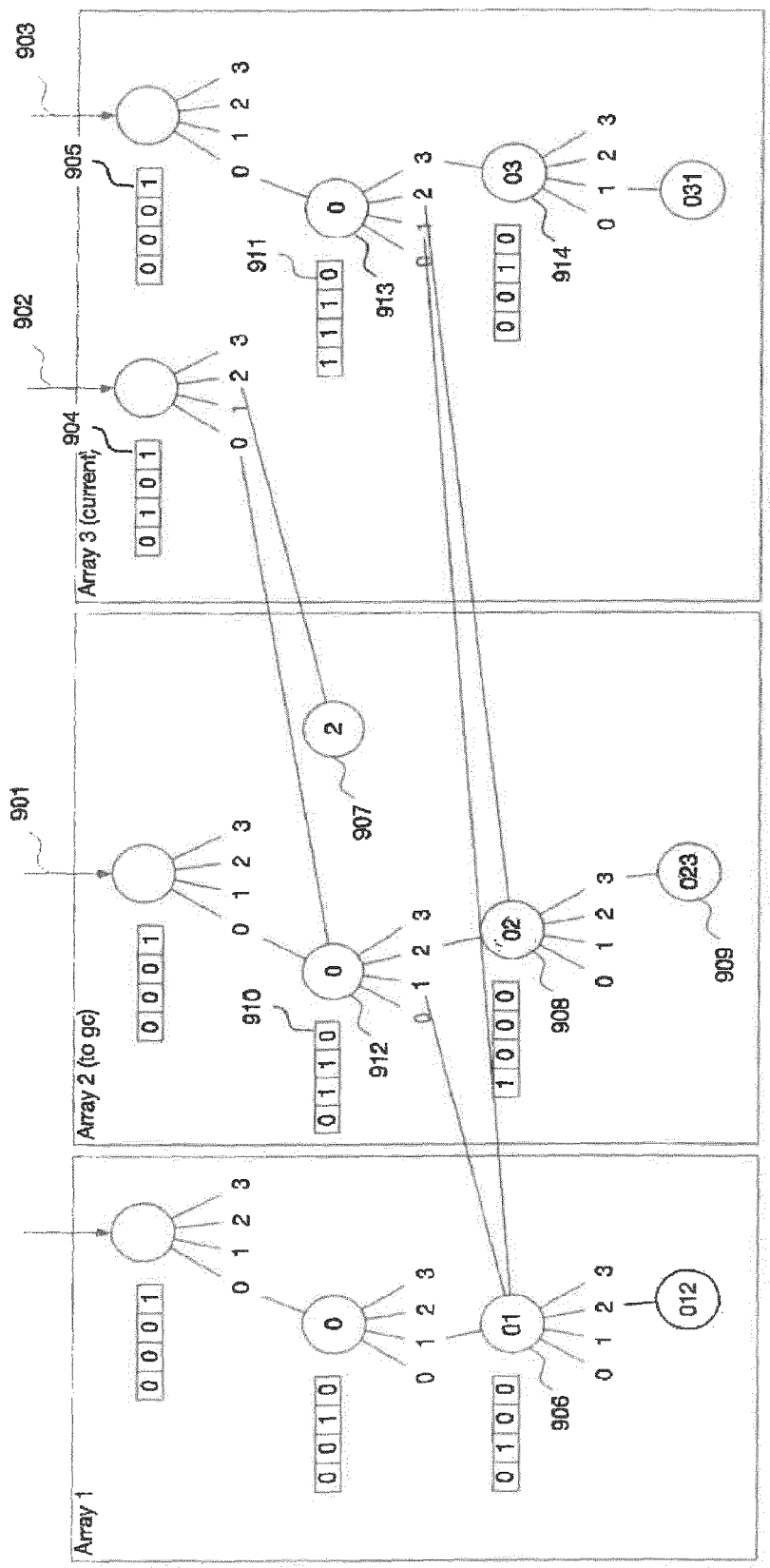
FIG. 9 illustrates an example for garbage collection of multiple arrays according to FIG. 8.

FIG. 9. illustrates an example for garbage collection of multiple arrays according FIG. 8. In the preferred embodiment, tries are 32-ary, 64-ary. Thus, the bitmap referencing the pointers to the child nodes may comprise 32 or 64 bits. For simplicity reasons, FIG. 9 shows a 4-ary trie.

The example of FIG. 9 comprises three trie root nodes 901, 902 and 903. The trie root node 901 is the root to a first version of the trie, where the root node lies in "Array 2" that is subject to garbage collection ("Array 2" is the "selected array"). The trie root node 902 is the root node to some later second version of the trie that results from the first transaction that occurs after switching from "Array 2" to "Array 3" as current (active) array. The trie root node 903 is the current root of the trie.

For eviction of "Array 2" the trie nodes starting from the trie root nodes 902 and 903 are compared. As mentioned above, with regard to FIG. 8, the comparison may be performed by a bitwise AND of the bitmaps of the nodes (level-by-level and from top-to-down).

In a first step, bitmaps 904 and 905 are compared by using a bitwise AND operation. The result of the comparison reveals, that node 907 (key "2") is no longer present in the current trie and does not have to be evicted (copied to the current array).

In a next step, the bitmaps on the next level 910, 911 of the nodes 912 and 913 are compared, and it is determined that node 906, which is part of the key "012", is present in both tries, but is stored in an array ("Array 1") before "Array 2". Therefore, the node is not traversed (ignored) and does not need to be copied to the current array, as "Array 1" is not subject to garbage collection. For the evaluation whether a node and its child nodes can be ignored because they lie in an array stored before the selected array, a bitmap comparison is not necessary. This evaluation can also be performed if, for example, only one trie is traversed. As mentioned above, a node may be referenced by a pointer having two parts, wherein a first part points to the array using an index in a list of all arrays and a second part holds the index within that specific array. Thus, the evaluation if a node is stored in the selected array or a previous array may be performed by evaluating the first part of the pointer.

Further, by comparing the same bitmaps 910, 911, the path to node 914 is not followed because the key prefix "03" is not present in the trie referenced by trie root node 902.

Further, by comparing the same bitmaps 910, 911, it is revealed that nodes 908 and 909 that are part of key "023" are still reachable from the current trie and thus, have to be evicted (copied) to the current array.

What is claimed is:

1. A computer-implemented method for identifying unused memory to be freed that is occupied by trie nodes of one or more tries comprising database indexes of an electronic database application or information retrieval system, the method comprising:
   storing an array comprising one or more chunks, wherein a chunk is configured to store a trie node, and wherein the array comprises at least a first chunk containing a first trie node;
   storing a free chunk list indicating which chunks of the array are free to store a new trie node;
   while updating the first trie node during a first transaction, determining if the first trie node has been created during the first transaction or during a second transaction;
   adding the first chunk containing the first trie node to the free chunk list if it is determined that the first trie node has been created during the first transaction; and
   adding the first chunk containing the first trie node to a pending free chunk list if it is determined that the first trie node has been created during the second transaction prior to the first transaction.

2. The method according to claim 1, wherein if it is determined that the first trie node has been created during the first transaction, the method further comprises: adding the first chunk containing the first trie node to the free chunk list.

3. The method according to claim 1, wherein the adding of the first chunk containing the first trie node to the pending free chunk list comprises generating a list entry in the pending free chunk list that is associated with the first transaction and contains a reference to the first chunk.

4. The method according to claim 3, wherein the list entry in the pending free chunk list that is associated with the first transaction allows referencing all chunks that have been created during one or more transactions prior to the first transaction and have been updated during the first transaction.

5. The method according to claim 4, wherein the referencing of all chunks that have been created during one or more transactions prior to the first transaction and have been updated in the first transaction is realized with a pointer associated with the first transaction pointing to a chain of chunks that have been created during one or more transactions prior to the first transaction and have been updated in the first transaction.

6. The method according to claim 1, wherein the method further comprises: storing a transaction list containing active database transactions; determining if the pending free chunk list comprises one or more entries associated with a transaction that is older than the oldest transaction in the transaction list; if it is determined that the pending free chunk list comprises one or more entries associated with a transaction that is older than an oldest transaction in the transaction list, moving the chunks associated with the one or more entries to the free chunk list.

7. The method according to claim 1, wherein each chunk comprises a payload value and a value identifying the transaction during which it is created.

8. The method according to claim 1, wherein updating the first trie node during a first transaction comprises creating a second trie node as a copy of the first trie node with updated values.

9. The method according to claim 7, wherein updating the first trie node during a first transaction comprises creating a second chunk containing the second trie node, wherein the value identifying the transaction during which the chunk is created corresponds to the first transaction.

10. The method according to claim 7, wherein the value identifying the transaction during which a node is created is a transaction identifier.

11. The method according to claim 10, wherein the determination if the first trie node has been created during the first transaction is performed by comparing the transaction identifier of the first transaction with the transaction identifier of the first chunk.

12. The method according to claim 10, wherein the determination whether a transaction is older than the oldest transaction in the transaction list is performed by comparing transaction identifiers, wherein an older transaction has a lower transaction identifier than a newer transaction.

13. The method according to claim 1, wherein the array further comprises free space not occupied by chunks.

14. The method according to claim 1, wherein each node on the array is stored as a long integer.

15. The method according to claim 1, wherein each node in a trie is referenced by a pointer comprising an index of the node in the array.

16. The method according to claim 1, wherein the size of the array is limited.

17. The method according to claim 1, wherein the one or more chunks comprise chunks having different sizes and chunks having the same sizes, wherein each chunk of a different size is referenced by a pointer stored in the free chunk list and wherein the chunks referenced by a pointer stored in the free chunk list comprise pointers to chunks of the same size as themselves.

18. The method according to claim 17, wherein the one or more chunks comprise chunks of 64 different sizes.

19. The method according to claim 17, wherein the different sizes are associated with the number of pointers contained in each node pointing to child nodes.

20. The method according claim 17, wherein chunks of the same size are linked to each other by pointers.

21. A non-transitory computer readable medium having stored thereon instructions for identifying unused memory to be freed that is occupied by trie nodes of one or more tries comprising database indexes of an electronic database application or information retrieval system that, when executed, cause a processor to perform operations comprising:
   storing an array comprising one or more chunks, wherein a chunk is configured to store a trie node, and wherein the array comprises at least a first chunk containing a first trie node;
   storing a free chunk list indicating which chunks of the array are free to store a new trie node;
   while updating the first trie node during a first transaction, determining if the first trie node has been created during the first transaction or during a second transaction;
   adding the first chunk containing the first trie node to the free chunk list if it is determined that the first trie node has been created during the first transaction; and
   adding the first chunk containing the first trie node to a pending free chunk list if it is determined that the first trie node has been created during the second transaction prior to the first transaction.

22. The non-transitory computer readable medium according to claim 21, wherein the adding of the first chunk containing the first trie node to the pending free chunk list comprises generating a list entry in the pending free chunk list that is associated with the first transaction and contains a reference to the first chunk.

23. The non-transitory computer readable medium according to claim 22, wherein the list entry in the pending free chunk list that is associated with the first transaction allows referencing all chunks that have been created during one or more transactions prior to the first transaction and have been updated during the first transaction.

24. The non-transitory computer readable medium according to claim 23, wherein the referencing of all chunks that have been created during one or more transactions prior to the first transaction and have been updated in the first transaction is realized with a pointer associated with the first transaction pointing to a chain of chunks that have been created during one or more transactions prior to the first transaction and have been updated in the first transaction.

25. The non-transitory computer readable medium according to claim 21, wherein the instructions, when executed, cause the processor to perform further operations comprising storing a transaction list containing active database transactions; determining if the pending free chunk list comprises one or more entries associated with a transaction that is older than the oldest transaction in the transaction list; if it is determined that the pending free chunk list comprises one or more entries associated with a transaction that is older than an oldest transaction in the transaction list, moving the chunks associated with the one or more entries to the free chunk list.

26. The non-transitory computer readable medium according to claim 21, wherein each chunk comprises a payload value and a value identifying the transaction during which it is created,
   wherein the value identifying the transaction during which a node is created is a transaction identifier, and
   wherein the determination if the first trie node has been created during the first transaction is performed by comparing the transaction identifier of the first transaction with the transaction identifier of the first chunk.

27. The non-transitory computer readable medium according to claim 21, wherein each chunk comprises a payload value and a value identifying the transaction during which it is created,
   wherein the value identifying the transaction during which a node is created is a transaction identifier, and
   wherein the determination whether a transaction is older than the oldest transaction in the transaction list is performed by comparing transaction identifiers, wherein an older transaction has a lower transaction identifier than a newer transaction.

28. A data-processing device or system for identifying unused memory to be freed that is occupied by trie nodes of one or more tries comprising database indexes comprising one or more processors and memory, the data-processing device or system being configured:
   to store an array comprising one or more chunks, wherein a chunk is configured to store a trie node, and wherein the array comprises at least a first chunk containing a first trie node;
   to store a free chunk list indicating which chunks of the array are free to store a new trie node;
   while updating the first trie node during a first transaction, to determine if the first trie node has been created during the first transaction or during a second transaction;
   to add the first chunk containing the first trie node to the free chunk list if it is determined that the first trie node has been created during the first transaction; and
   to add the first chunk containing the first trie node to a pending free chunk list if it is determined that the first trie node has been created during the second transaction prior to the first transaction.

29. The device or system according to claim 28, wherein the adding of the first chunk containing the first trie node to the pending free chunk list comprises generating a list entry in the pending free chunk list that is associated with the first transaction and contains a reference to the first chunk.

30. The device or system according to claim 29, wherein the list entry in the pending free chunk list that is associated with the first transaction allows referencing all chunks that have been created during one or more transactions prior to the first transaction and have been updated during the first transaction.

31. The device or system according to claim 30, wherein the referencing of all chunks that have been created during one or more transactions prior to the first transaction and have been updated in the first transaction is realized with a pointer associated with the first transaction pointing to a chain of chunks that have been created during one or more transactions prior to the first transaction and have been updated in the first transaction.

32. The device or system according to claim 28, wherein the device or system is further configured to: store a transaction list containing active database transactions; determine if the pending free chunk list comprises one or more entries associated with a transaction that is older than the oldest transaction in the transaction list; if it is determined that the pending free chunk list comprises one or more entries associated with a transaction that is older than an oldest transaction in the transaction list, move the chunks associated with the one or more entries to the free chunk list.

33. The device or system according to claim 28, wherein each chunk comprises a payload value and a value identifying the transaction during which it is created,
wherein the value identifying the transaction during which a node is created is a transaction identifier, and
wherein the determination if the first trie node has been created during the first transaction is performed by comparing the transaction identifier of the first transaction with the transaction identifier of the first chunk.

34. The device or system according to claim 28, wherein each chunk comprises a payload value and a value identifying the transaction during which it is created,
wherein the value identifying the transaction during which a node is created is a transaction identifier, and
wherein the determination whether a transaction is older than the oldest transaction in the transaction list is performed by comparing transaction identifiers, wherein an older transaction has a lower transaction identifier than a newer transaction.

35. The device or system according to claim 28, wherein the one or more chunks comprise chunks having different sizes and chunks having the same sizes, wherein each chunk of a different size is referenced by a pointer stored in the free chunk list and wherein the chunks referenced by a pointer stored in the free chunk list comprise pointers to chunks of the same size as themselves.

\* \* \* \* \*